US010672105B2

(12) United States Patent
Sumita

(10) Patent No.: US 10,672,105 B2
(45) Date of Patent: Jun. 2, 2020

(54) DISPLAY CONTROL APPARATUS CHANGING SIZE OF PLURALITY OF OBJECTS DISPLAYED ON DISPLAY DEVICE, CONTROL METHOD OF THE DISPLAY CONTROL APPARATUS, AND COMPUTER EXECUTABLE INSTRUCTIONS FOR CAUSING A COMPUTER TO EXECUTE THE CONTROL METHOD

(71) Applicant: CANON KABUSHIKI KAISHA, Tokyo (JP)

(72) Inventor: Chisei Sumita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/893,407

(22) Filed: Feb. 9, 2018

(65) Prior Publication Data

US 2018/0165795 A1    Jun. 14, 2018

Related U.S. Application Data

(63) Continuation of application No. 14/022,025, filed on Sep. 9, 2013, now abandoned.

(30) Foreign Application Priority Data

Sep. 14, 2012 (JP) .................................. 2012-203086

(51) Int. Cl.
*G06F 3/0484* (2013.01)
*G06T 3/40* (2006.01)
*G06F 3/0481* (2013.01)

(52) U.S. Cl.
CPC .............. *G06T 3/40* (2013.01); *G06F 3/0481* (2013.01); *G06F 3/04845* (2013.01); *G06F 3/04847* (2013.01)

(58) Field of Classification Search
None
See application file for complete search history.

(56) References Cited

U.S. PATENT DOCUMENTS 6,694,487 B1    2/2004  Ilsar
7,391,423 B1 *  6/2008  Manzari ................ G06T 3/4092
                                                    345/619

(Continued)

FOREIGN PATENT DOCUMENTS

JP    H05-150926 A    6/1993
JP    2008-140361 A   6/2008

(Continued)

*Primary Examiner* — Ryan McCulley
(74) *Attorney, Agent, or Firm* — Canon U.S.A., Inc., IP Division

(57) ABSTRACT

An apparatus includes a memory, a processor, a control unit and an instruction unit. The control unit controls display on a display unit on which an image based on received image data is displayed. The instruction unit provides an instruction to switch a display size of the image on the display unit. When the instruction unit provides the instruction, in a state in which the image before the switching is performed is displayed on the display unit, the control unit causes display of a first object visually indicating a second display size of the image that is to be displayed on the display unit, the second display size being a size after the switching is performed, and, when the second display size is determined on the basis of the instruction from the instruction unit, the control unit causes display of the image based on the second display size.

15 Claims, 12 Drawing Sheets

(56) References Cited

U.S. PATENT DOCUMENTS

| | | |
|---|---|---|
| 8,400,477 B1 | 3/2013 | Young et al. |
| 2008/0218523 A1 | 9/2008 | Zuverink |
| 2008/0225153 A1* | 9/2008 | Fagans .................. G06F 3/0481 |
| | | 348/333.01 |
| 2009/0007019 A1 | 1/2009 | Kobayashi |
| 2013/0263055 A1 | 10/2013 | Victor |
| 2013/0321340 A1 | 12/2013 | Seo et al. |

FOREIGN PATENT DOCUMENTS

| | | |
|---|---|---|
| JP | 2011-180288 A | 9/2011 |
| JP | 2014-059369 A | 4/2014 |

* cited by examiner

FIG. 12

| LIST NUMBER | FILE NAME | TIMESTAMP |
|---|---|---|
| 1 | ¥¥DCIM¥100AAA¥IMG_0001 | 12/01/2011/07:00:02 |
| 2 | ¥¥DCIM¥101AAA¥IMG_0018 | 01/08/2012/08:10:18 |
| 3 | ¥¥DCIM¥102AAA¥IMG_0405 | 02/03/2012/04:12:54 |
| 4 | ¥¥DCIM¥105AAA¥IMG_0251 | 04/01/2012/07:01:32 |
| 5 | ¥¥DCIM¥105AAA¥IMG_0252 | 04/01/2012/07:05:12 |

DISPLAY CONTROL APPARATUS CHANGING SIZE OF PLURALITY OF OBJECTS DISPLAYED ON DISPLAY DEVICE, CONTROL METHOD OF THE DISPLAY CONTROL APPARATUS, AND COMPUTER EXECUTABLE INSTRUCTIONS FOR CAUSING A COMPUTER TO EXECUTE THE CONTROL METHOD

CROSS REFERENCE TO RELATED APPLICATIONS

This application is a continuation application of U.S. patent application Ser. No. 14/022,025 filed on Sep. 9, 2013 which claims the benefit of Japanese Patent Application No. 2012-203086, filed Sep. 14, 2012, each of which are hereby incorporated by reference herein in its entirety.

BACKGROUND

Field

Aspects of the present invention generally relate to an apparatus and a method.

Description of the Related Art

Recently, for example, digital cameras, camera-equipped cellular phones, and multi-function printers (hereinafter, abbreviated as MFPs) have been commercialized. In such a device, digital image data stored in a storage medium such as a memory card can be displayed on an image display apparatus embedded in the device. To check multiple pieces of image data simultaneously, multiple thumbnail images can be simultaneously displayed on one image display apparatus.

The applicant of this application has proposed a method of displaying display images by changing the number of parts into which the screen is divided and by changing the display magnification of the display images, in Japanese Patent Laid-Open No. 2011-180288. In Japanese Patent Laid-Open No. 2011-180288, to display multiple digital images, image data is decoded so as to be expanded to a certain size.

However, after an image has been displayed using a certain magnification, when the display magnification is to be changed again, the time period from rasterization to display of the image data is long, resulting in a problem in that redisplay of the image data takes time. Provision of hardware or the like for rasterizing and displaying image data at high speed increases the cost. To display multiple images, it is necessary to perform decoding multiple times, as many as the number of pieces of the image data to be displayed, increasing the processing load every time the display magnification of a display image is changed.

SUMMARY

According to an aspect of the present invention, an apparatus includes a memory, a processor in communication with the memory, the processor being configured to control, a control unit, and an instruction unit. The control unit controls display on a display unit on which an image based on received image data is displayed. The instruction unit provides an instruction to switch a display size of the image on the display unit. In a case where the instruction unit provides the instruction, in a state in which the image having a first display size before the switching is performed is displayed on the display unit, the control unit causes display of a first object visually indicating a second display size of the image that is to be displayed on the display unit, the second display size being a size after the switching is performed, and, in a case where the second display size is determined on the basis of the instruction from the instruction unit, the control unit causes display of the image based on the second display size.

Further features of the present disclosure will become apparent from the following description of exemplary embodiments with reference to the attached drawings.

BRIEF DESCRIPTION OF THE DRAWINGS

FIG. 12 is a diagram illustrating an exemplary configuration of an image list according to the first embodiment.

DESCRIPTION OF THE EMBODIMENTS

First Embodiment

Figure 1:
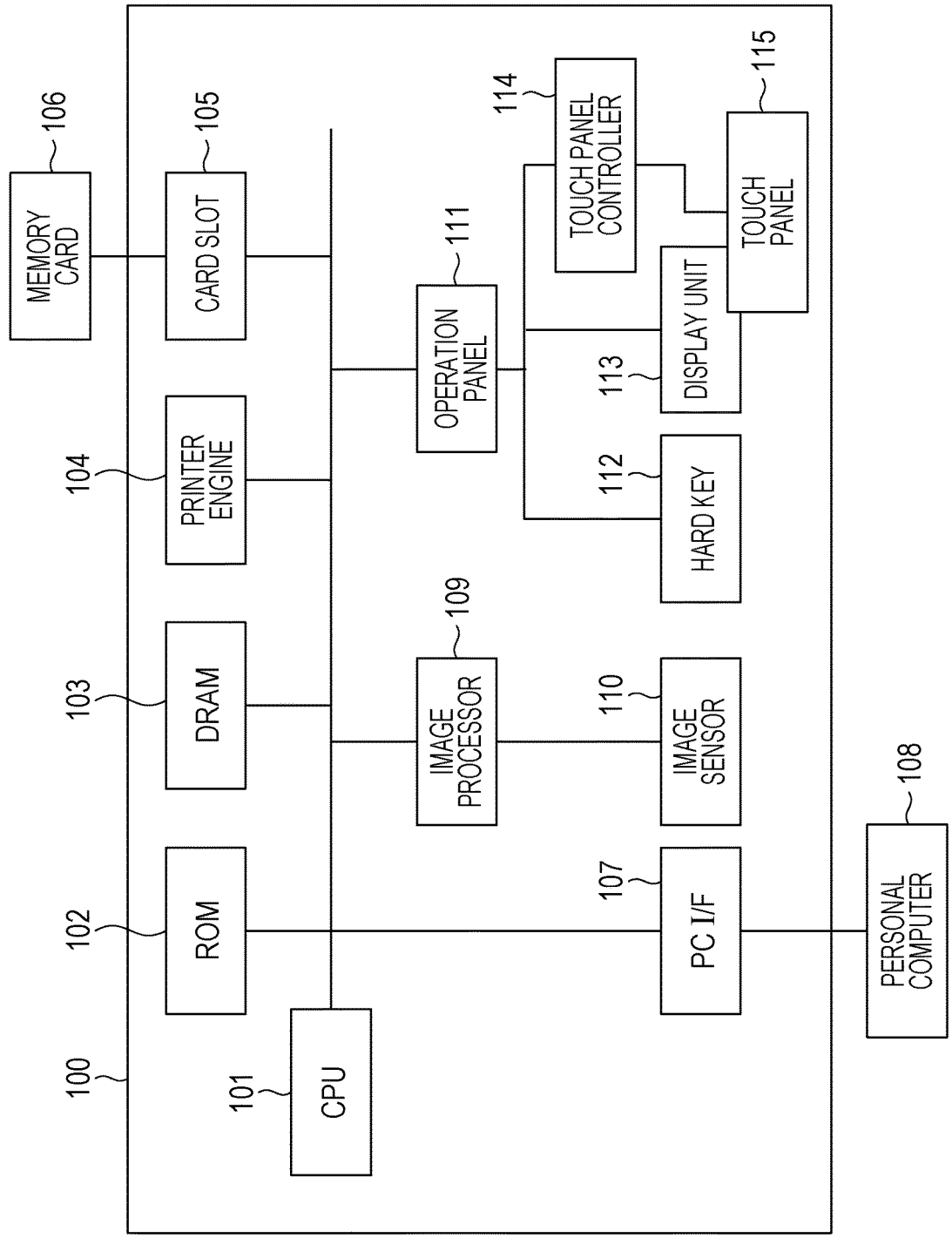
FIG. 1 is a schematic view illustrating a display control apparatus according to a first embodiment.

Referring to the drawings, the following disclosure will be described in detail by taking a suitable embodiment as an example. It is intended that, unless otherwise indicated, the below-described embodiment is not seen to be limited to the relative arrangement of components, a display screen, and the like which are described in the present embodiment.

FIG. 1 is a block diagram illustrating a circuit configuration of an image processing apparatus as an embodiment of a display control apparatus. An image processing apparatus 100 according to the present embodiment is an MFP having a scanning function, a printing function, and a card direct function.

The image processing apparatus 100 includes a central processing unit (CPU) 101, a read-only memory (ROM) 102, a dynamic random access memory (DRAM) 103, a printer engine 104, a card slot 105, a personal computer interface (PC I/F) 107, an image processor 109, and an operation panel 111, which are connected to each other via a system bus.

The CPU 101 is a system controller of the image processing apparatus 100, and controls the entire image processing apparatus 100. The CPU 101 loads a program stored in the ROM 102 and the like to the DRAM 103 and executes the program on the DRAM 103, thereby controlling the entire image processing apparatus 100 according to the present embodiment. The ROM 102 stores a system control program for the image processing apparatus 100. The CPU 101 performs various operations for the image processing apparatus 100 on the basis of, for example, the system control program stored in the ROM 102. In the present embodiment, the system control program executed by the CPU 101 is stored in the ROM 102. However, the present embodiment is not limited to this, and the system control program may be stored in an external storage medium, such as a floppy disk or a compact disc-read-only memory (CD-ROM).

The DRAM 103 stores mainly image data, and the printer engine 104 prints an image on a recording medium (print paper) on the basis of received image data.

The PC I/F 107 is an interface for connecting the image processing apparatus 100 to a personal computer 108. The personal computer 108 is a host computer which can change various types of setting data of the image processing apparatus 100 and which can transmit a request to start various operations via the PC I/F 107.

An image sensor 110 is a so-called scanner unit. That is, the image sensor 110 is an image reading unit such as a contact-type reading sensor for reading out an image on platen glass, and converts a read-out image into image data. The image processor 109 performs various types of image processing on the image data received from the image sensor 110.

The operation panel 111 includes a power switch (not illustrated) and various hard keys 112, a display unit 113 for displaying, for example, the operation condition or the state of the image processing apparatus 100, and a touch panel 115 disposed on the display unit 113. The operation panel 111 is configured such that, when an operator touches the touch panel 115 with his/her finger or a tool such as a touch pen, a touch panel controller 114 detects position coordinates at which the touching is performed with the finger or the tool, whereby a touch event is generated. A procedure of generating a touch event by using the touch panel 115, a method for detecting position coordinates, and an operation procedure will be described below.

The card slot 105 is an interface for connecting a memory card 106 to the image processing apparatus 100. When the memory card 106 is connected to the image processing apparatus 100, a user can select/view any image from images stored in the memory card 106, via the touch panel 115 and the display unit 113.

After the image selected by the user is subjected to various types of print setting, when an instruction to print the image is transmitted, the CPU 101 analyzes the image, and the printer engine 104 prints it. At that time, the DRAM 103 is used as a buffer for the print data. Only image selected from the memory card 106 may be stored in the DRAM 103. Alternatively, to increase the print speed, all of the images stored in the memory card 106 may be stored in the DRAM 103.

In the present embodiment, the printer engine 104 and the operation panel 111 can be separately processed, and a multitask operation can be performed such that, for example, printing is performed while a user operation is being received via the operation panel 111. However, in this configuration, the CPU 101 performs all of the processes. Therefore, when the load of processes which are simultaneously performed and which have a heavy load exceeds the throughput of the CPU 101, the processes which are simultaneously performed are affected.

Figure 2A:
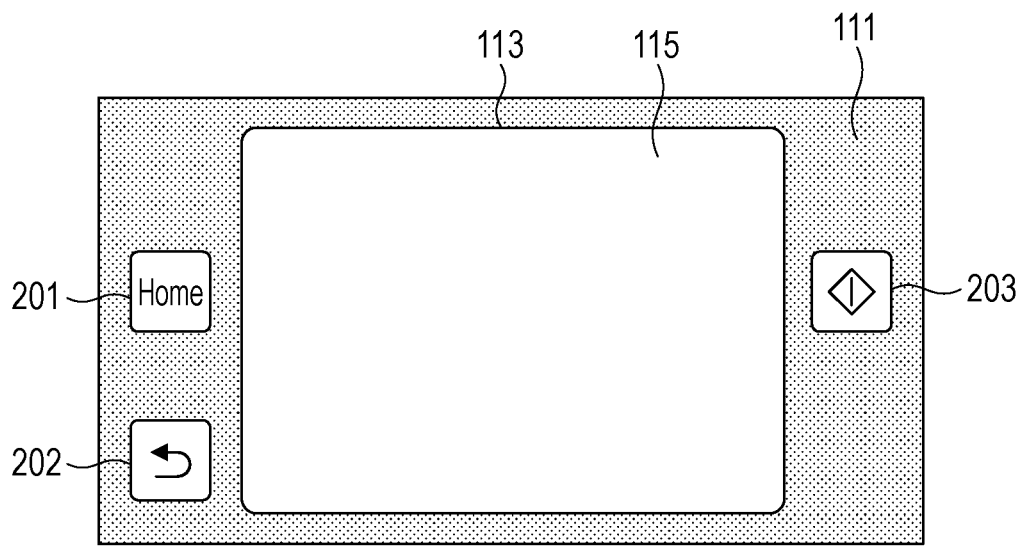
FIGS. 2A and 2B are diagrams for describing an outer appearance view and a configuration of an operation panel of the display control apparatus according to the first embodiment.

With reference to FIGS. 2A to 4B, the operation panel 111 according to the present embodiment and how to operate the touch panel 115 of the operation panel 111 will be described in detail. FIG. 2A is a diagram illustrating an exemplary outer appearance configuration of the operation panel 111 according to the present embodiment. The operation panel 111 includes a home key 201, a back key 202, and a start key 203 as the hard keys 112.

The home key 201 is a key for making a transition to the home screen which is a starting point of all functions. In the home screen, various functions are classified into some categories, and each of the functions is displayed in a form of an icon. By touching one of the icons, a user can select a function.

The back key 202 is a key for making a transition to the previous screen. Screen transitions starting from the home screen are stored in a history. By pressing the back key 202, a transition to the previous screen can be performed by tracing the history. Accordingly, the back key 202 is disabled in the home screen which is a starting point of all transitions.

The start key 203 is a key for, for example, starting an operation in which the image sensor 110 reads out a document image, and starting a print operation performed by the printer engine 104.

On the display unit 113, display objects (not illustrated) constituted by icons, images, soft keys, and the like are arranged in accordance with certain layout information. Flag information indicating whether or not a touch event is to be received is attached to each of the display objects. When a touch event is issued to a display object to which flag information indicating that a touch event is to be received is attached, a notification about this is transmitted to the CPU 101 which performs a process programmed for the display object. Display of display objects arranged on the display unit 113 is managed in multiple hierarchical levels (layers), each of which can be drawn separately. The layer structure will be described in detail. Display objects drawn in the layers are stacked on top of one another in predetermined order so that the display objects can be displayed on the display unit 113. Among the display objects stacked in the layer structure, a display object arranged in an upper layer receives a touch event, whereby a touch event is issued.

Figure 2B:
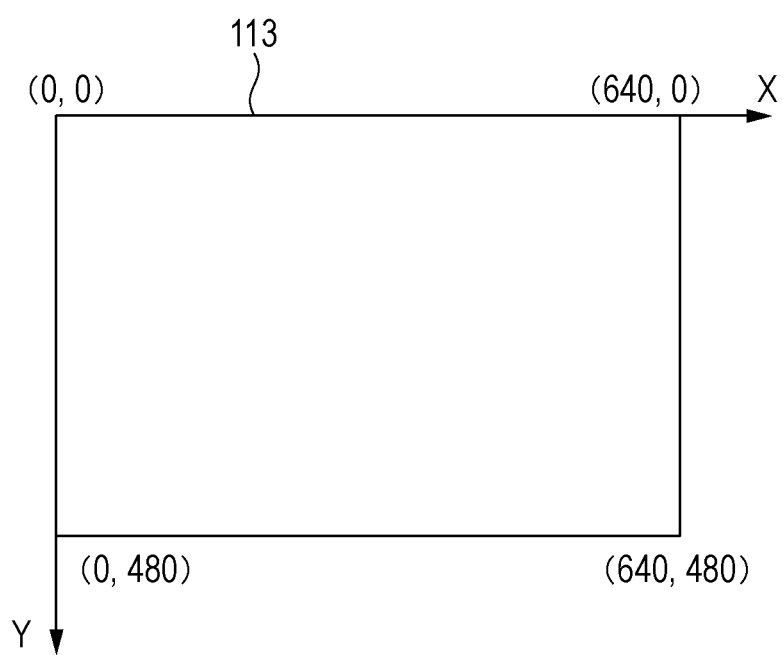

FIG. 2B is a schematic diagram illustrating how to handle position information in the touch panel 115. As illustrated in FIG. 2B, position coordinates are defined as a position in a two-dimensional XY coordinate plane in which, for example, the origin is located at the upper left corner. In the present embodiment, the display unit 113 contains 640 pixels in X direction and 480 pixels in Y direction. To match this configuration, the touch panel 115 has a resolution of 640 in the X direction and 480 in the Y direction. Hereinafter, the term "touch" is used when the CPU 101 determines that position coordinates at which touching is detected on the touch panel 115 match the display position of an object displayed on the display unit 113. The term "release" is used when the CPU 101 determines that the touching is released. While the touching is held, a timer (not illustrated) causes a dragging event including the position information to be issued periodically. When the touching is released, a release event is issued. Thus, instead of designating a position on the display unit 113 by using a mouse which is a pointing device, a finger of an operator, a touch pen, or the like serves as a direct pointing device, and a position on the display unit 113 can be designated.

In the above-described configuration, on the operation panel 111 of the image processing apparatus 100, a user operates the hard keys 112 or the touch panel 115 while viewing the display unit 113, whereby an instruction can be input or various settings can be performed. In addition, the state of the image processing apparatus 100 can be checked through the display unit 113.

Figure 11:
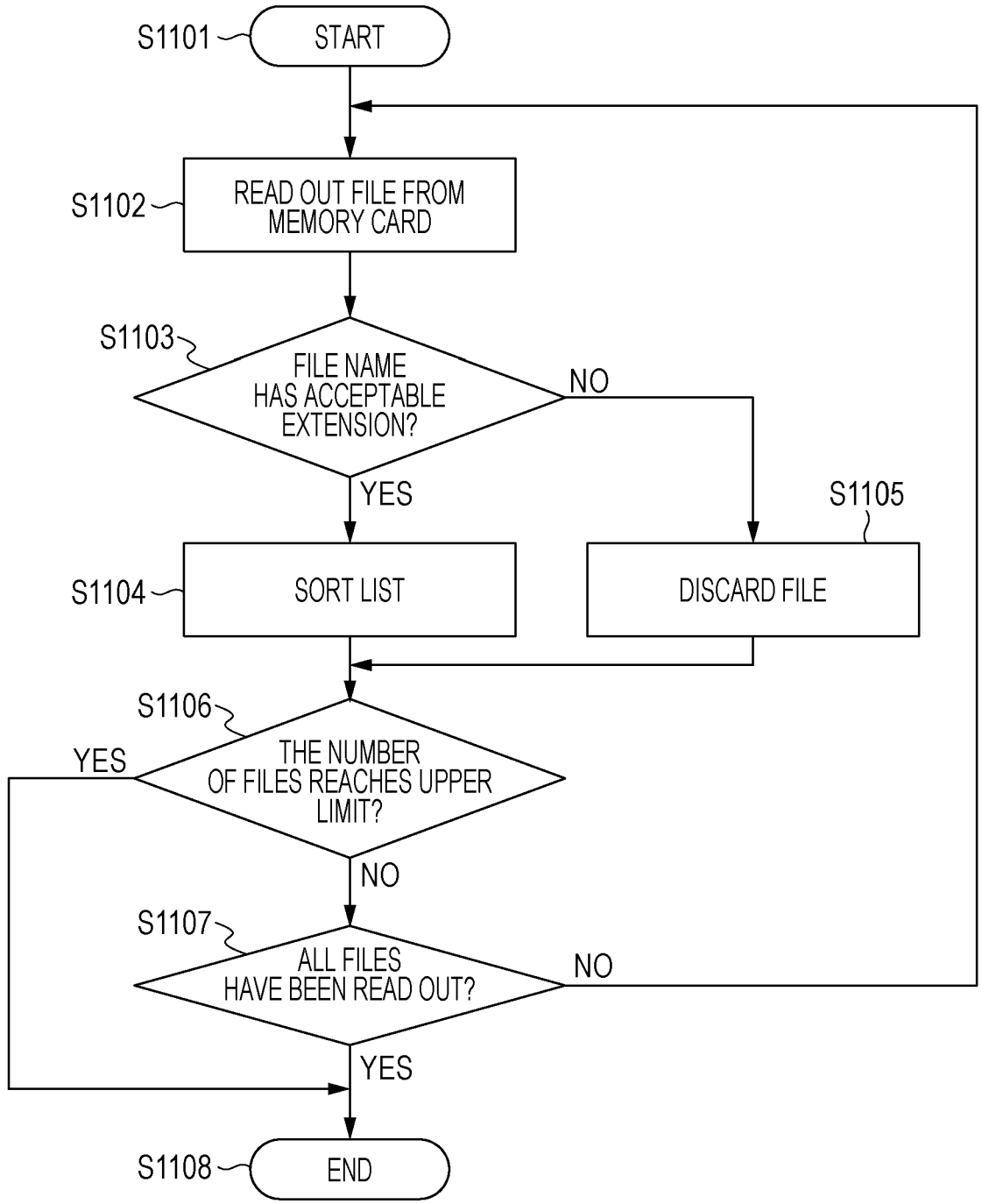
FIG. 11 is a flowchart of a process of generating an image list, according to the first embodiment.

With reference to FIG. 11, a procedure of generating an image list when the memory card 106 is connected to the card slot 105 will be described. FIG. 11 is a flowchart of a procedure in which an image list is generated and which is performed by the CPU 101 when the memory card 106 is connected to the card slot 105. In the present embodiment, the image processing apparatus 100 is compatible with the FAT file system, and recognizes only an image file whose extension is ".jpg" (an image compressed in the JPEG format) as an acceptable image file.

When the CPU 101 detects the memory card 106 connected to the card slot 105 (in step S1101), the CPU 101 reads out one piece of file information from digital data stored in the memory card 106 (in step S1102). Information which is read out as the file information includes a file name including an extension, and timestamp information (the update date and time of a file).

Then, the CPU 101 determines whether or not the piece of file information is acceptable by checking if the read-out file name has an acceptable extension (in step S1103). If the file information is not acceptable, the CPU 101 discards the file information (in step S1105). If the file information is acceptable, the CPU 101 adds the newly read-out file information to an image list, and sorts the pieces of file information in ascending order of timestamp so as to update the image list (in step S1104). In this step, sorting is performed in ascending order of timestamp. However, sorting of the image list is not limited to this. For example, the image list may be sorted in descending order of timestamp, or may be sorted on the basis of another type of file information.

Since the image list is stored on the DRAM 103, a limit is set to the number of pieces of file information in the image list. Therefore, the CPU 101 determines whether or not the number of pieces of file information reaches the upper limit for the list (in step S1106). If the number of pieces of file information reaches the upper limit, for example, if the number of pieces of file information reaches 2000 when the upper limit is set to 2000, the CPU 101 ends the process of generating an image list (in step S1108). If the number of pieces of file information does not reach the upper limit, the CPU 101 repeatedly checks if the update of the image list has been performed for all of the files (in step S1107), and completes the image list (in step S1108).

With reference to FIG. 12, an image list will be described. FIG. 12 is a diagram illustrating the data configuration of an image list stored in the DRAM 103. As illustrated in FIG. 12, an image list 1201 contains various types of information, such as a list number 1202, a file name 1203, and a timestamp 1204. The list number 1202 indicates the sequence number of each piece of the image data in the image list. The file name 1203 is a file name of each piece of the image data including path information. The timestamp 1204 is update date information of each piece of image data. In this example, five pieces of image data are illustrated.

With reference to FIGS. 3A to 8B, operations of operating the display unit 113 and the touch panel 115 and selecting/viewing any image from images stored in the image list 1201 generated from information in the memory card 106 will be described in detail.

Figure 3A:
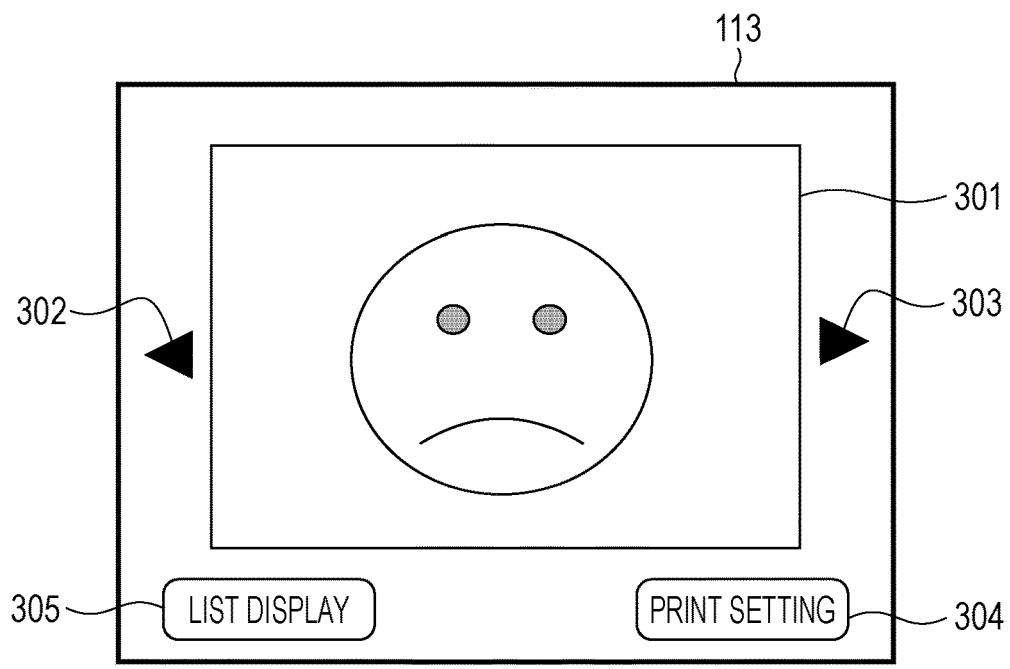
FIGS. 3A and 3B are diagrams illustrating exemplary displays in the one-screen display mode on a display unit according to the first embodiment.

FIG. 3A illustrates an exemplary display in the one-screen display mode in which an image in the memory card 106 is displayed on the display unit 113. In the one-screen display mode, an image display unit 301, image feeding keys 302 and 303, a print setting button 304, and a list display button 305 are displayed on the display unit 113.

Figure 3B:
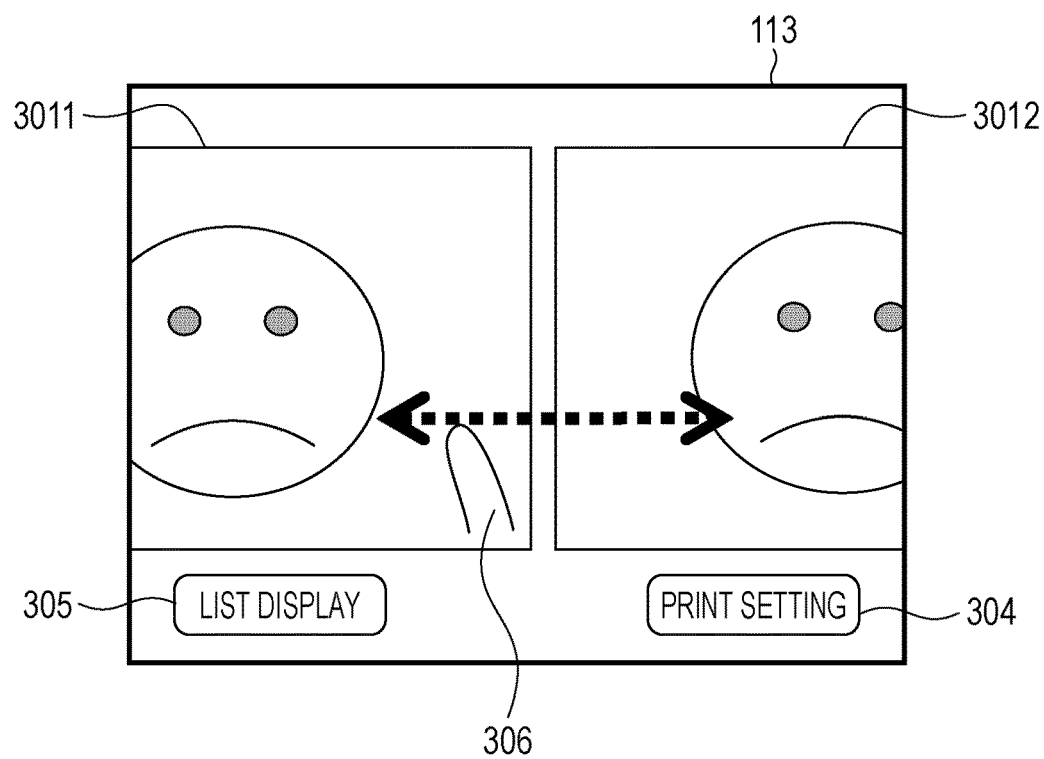

In the one-screen display mode, an image based on image data which is selected in the image list 1201 (by default, an image having the latest update date) is subjected to decoding through a software process performed by the CPU 101, and is displayed on the image display unit 301 as illustrated in FIG. 3A. In this state, when the start key 203 on the operation panel 111 is pressed, the CPU 101 causes the printer engine 104 to print the displayed image on a recording medium such as paper. An image other than the image displayed on the image display unit 301 is viewed when the image feeding key 302 or the image feeding key 303 disposed on the left or right side is touched. Thus, forward feed or backward feed is performed on the image list, and images are sequentially read out so as to be decoded and displayed on the image display unit 301. Using a feeding operation in which a finger 306 is moved while the finger 306 is being touched on the image display unit 301, only an image 3011 displayed on the image display unit 301 is moved to the left or to the right in accordance with detected position coordinates. FIG. 3B illustrates a state in which an image to be displayed on the image display unit 301 is being switched from the current image 3011 to a next image 3012 by using the finger 306 of a user. Thus, the image display unit 301 has a configuration in which a new image appears from the side opposite to the moving direction of the current image through an operation using the finger 306, enabling the previous or next image in the image list to be displayed. In other words, other images are hidden in a virtual manner on the left and right sides of the image 3011 displayed on the image display unit 301.

A user touches the print setting key 304 so as to display a print setting screen in which various settings about printing, such as the type (for example, paper type) and the size of a recording medium, and the image quality, can be set.

When a user touches the list display key 305, the screen is switched from the one-screen display mode to the list display mode, whereby multiple images are simultaneously displayed on the display unit 113. Thus, the user can check the images at the same time.

Figure 4A:
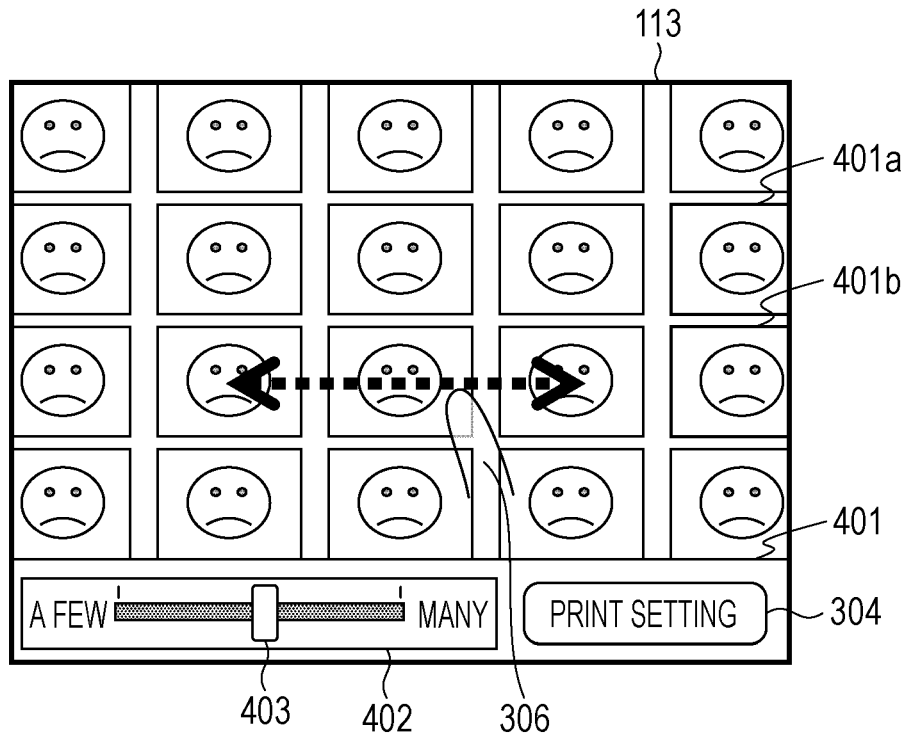
FIGS. 4A and 4B are diagrams illustrating exemplary displays in the list display mode on the display unit according to the first embodiment.

FIG. 4A illustrates an exemplary display on the display unit 113 in the list display mode. As illustrated in FIG. 4A, in the present embodiment, 20-image display in which the maximum number of displayed images in one screen is 20 is first performed in the list display mode. In the list display mode, an image display unit 401 on which twenty images are displayed, the print setting button 304, and a number-of-images switching unit 402 are displayed. When the list display mode is started, images stored in the memory card 106 are displayed in accordance with the image list in such a manner that each of the images (for example, 401a and 401b) is displayed at the predetermined position of a corresponding one of frames, into which the image display unit 401 is divided and the number of which is a predetermined number for the image display unit 401 (in FIG. 4A, 20 frames). To display images in this manner, pieces of image data for images to be displayed are sequentially read out from a memory card in accordance with the list, and are decoded to fit the size of the frames. When the image processing apparatus 100 does not have specific hardware for the decoding for display, the CPU 101 inevitably has a load so as to perform these series of processes multiple times, as many as the number of display images.

In the list display mode, when the number of pieces of file information in the image list is more than the number of display images, other images are hidden in a virtual manner on the left and right sides of the image display unit 401. By moving the finger 306 to the left or to the right while the image display unit 401 is being touched with the finger 306, only the images displayed in the image display unit 401 are moved to the left or to the right, and images appear in ascending or descending order of image sequence in the image list and are displayed.

When an image is to be selected, a user touches a specific image (for example, 401a), and then releases it, whereby switching to the one-screen display mode (see FIG. 3A) is performed, and the specified image is displayed on the image display unit 301.

The print setting button 304 is the same as that in FIG. 3A, and will not be described.

A touch operation on the number-of-images switching unit 402 enables the number of display images to be switched in the list display mode. In the present embodiment, the number-of-images switching unit 402 can accept multiple stages of switching, and the number of display images which corresponds to one of the stages is determined in accordance with the position of the number-of-images switching switch 403 disposed inside. That is, the number-of-images switching unit 402 is divided into multiple parts and each part is associated with a display size of an image. In the number-of-images switching unit 402, the range (not illustrated) in which the number-of-images switching switch 403 can be moved is allowed to be touched. In the present embodiment, when a user first touches the range in which the number-of-images switching switch 403 can be moved, even if the number-of-images switching switch 403 is not touched, the number-of-images switching switch 403 is moved to the touch position, and the number of display images is switched. In addition, the number-of-images switching switch 403 can be moved in a specific range (not illustrated) in the number-of-images switching unit 402 to the left or to the right in response to a touch operation performed by a user.

In the above-described configuration, switching to image display of a desired number of images can be selected from the stages, each of which corresponds to the possible maximum number of images to be displayed in one screen, through a touch operation on the number-of-images switching unit 402 or a user operation in which the number-of-images switching switch 403 is moved to the left or to the right. In the present embodiment, the switching can be performed in three stages: when the number-of-images switching switch 403 is located on the left, the number of images is small (six images); when it is located at the center, the number of images is a standard number (20 images); and when it is located on the right, the number of images is large (80 images). The display size of an image displayed in the image display unit 401 is different depending on the number of display images.

Figure 4B:
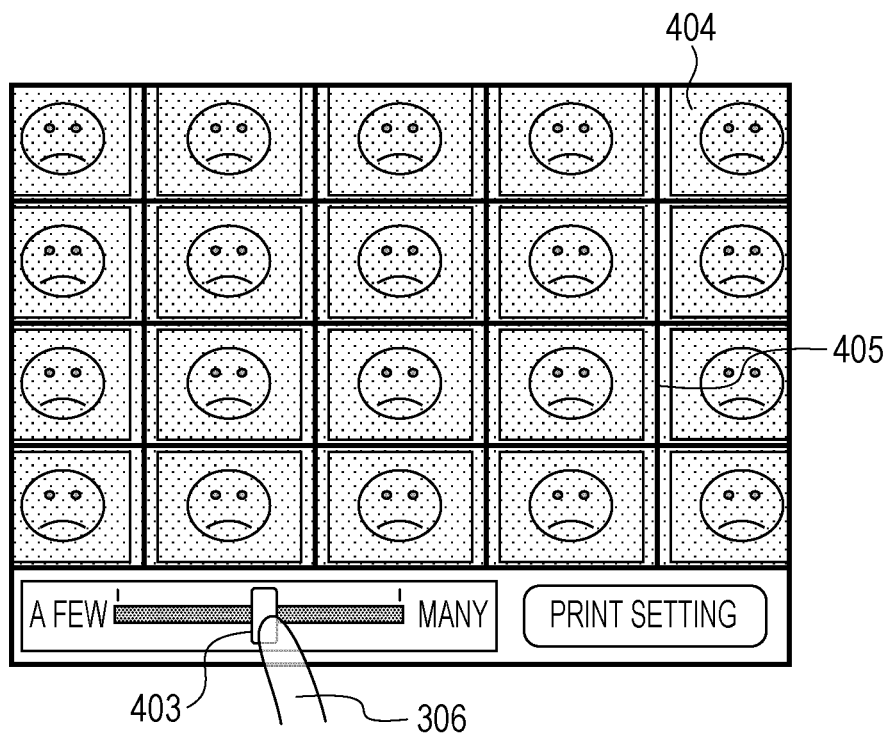

With reference to FIG. 4B, image display performed when switching is to be performed in the list display mode will be described. In the state in which the list display mode is on as illustrated in FIG. 4A, when the number-of-images switching switch 403 is touched with a finger, the display is switched to one as illustrated in FIG. 4B. The only difference between FIG. 4A and FIG. 4B is whether or not a masking object 404 and an image size object 405 are displayed in such a manner as to be stacked on top of the other. That is, when the display is switched to that as illustrated in FIG. 4B, the masking object 404 and the image size object 405 are additionally displayed.

Figure 5A:
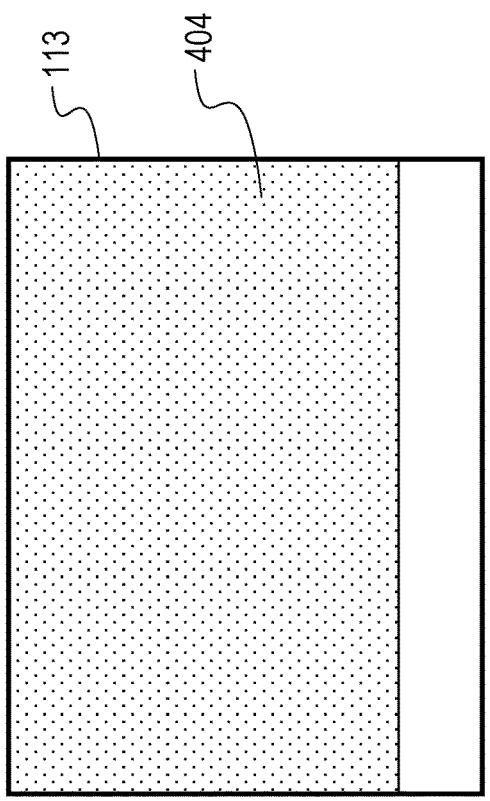
FIGS. 5A to 5D are diagrams for describing the layer structure of the display unit according to the first embodiment.
Figure 5C:
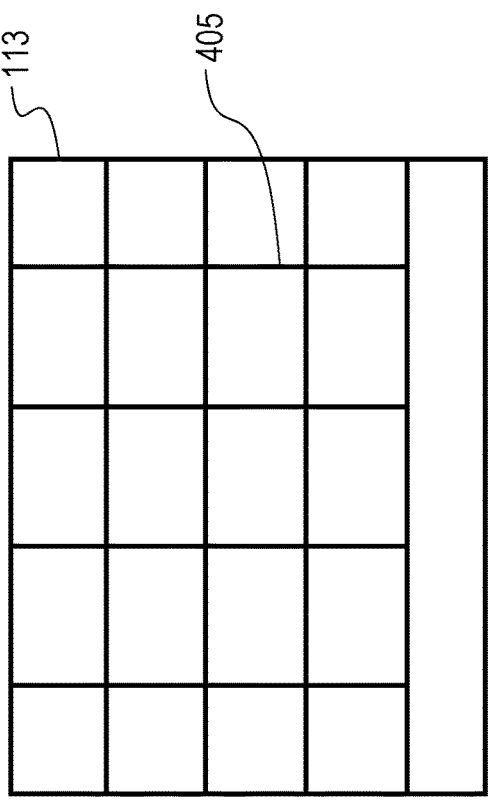
Figure 5B:
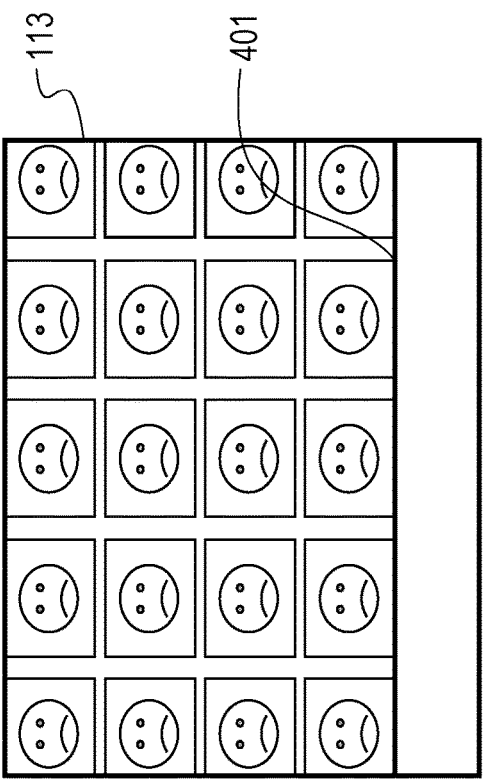

With reference to FIGS. 5A to 5D, images and objects displayed on the display unit 113 in FIG. 4B will be described. FIGS. 5A to 5D are diagrams illustrating layers into which the display on the display unit 113 is divided. That is, FIGS. 5A to 5D illustrate displays in the layers obtained through the division. An image-display-unit layer illustrated in FIG. 5A is the lowermost layer on which the image display unit 401 constituted by multiple images is displayed. A tool bar layer illustrated in FIG. 5B is a layer on the layer illustrated in FIG. 5A, and contains various instruction objects, specifically, the number-of-images switching unit 402 and a button operating unit in the print setting button 304. The transparent masking object 404 is displayed in a masking object layer illustrated in FIG. 5C. The image size object 405 is displayed in an image-size-object layer which is the topmost layer illustrated in FIG. 5D. The masking object 404 is an object for disabling a user operation performed on objects or the like disposed underneath. The image size object 405 is an object for indicating the image size obtained when the number of display images is changed through an instruction. In the present embodiment, the image size is changed in accordance with the number of pieces of display images for image data. The image size object 405 visually indicates the number of display images for image data and the display size changed in accordance with the number of display images.

Figure 5D:
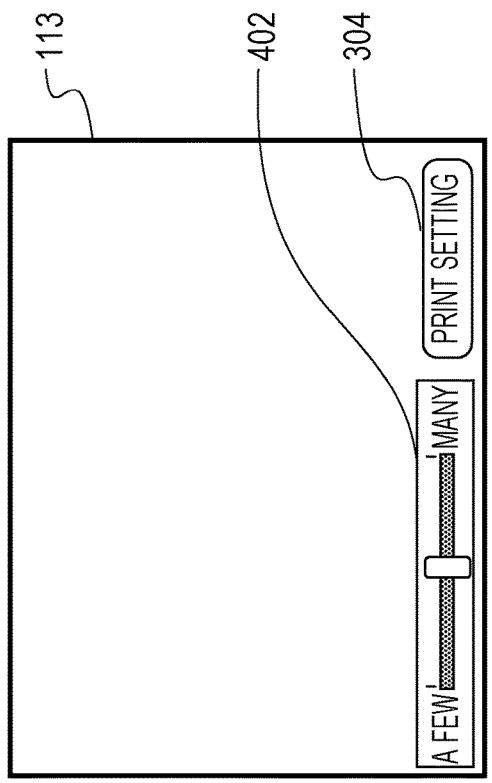

By stacking the layer in FIG. 5A, the layer in FIG. 5B, the layer in FIG. 5C, and the layer in FIG. 5D in this sequence from the bottom, the final image (in FIG. 4B) on the display unit 113 is generated. As illustrated in FIG. 4B, objects in the masking object layer and the image-size-object layer are disposed above the objects in the image-display-unit layer, and no objects are disposed above the objects in the tool bar layer. In addition, an event generated through a touch operation is issued for an object in an upper layer. Therefore, a touch event is issued for an object on the tool bar layer in FIG. 5B. The masking object 404 is disposed in such a manner as to overlie the image display unit 401 in the image-display-unit layer in FIG. 5A. Thus, a touch event is not issued for the image display unit 401. The masking object 404 is transparent, and a user can check the display in the image-display-unit layer. In the present embodiment, the image size object 405 displayed in an upper layer has a simple configuration having simple lines, rectangles, and the like. This enables the processing load for display to be relatively light. As described above, displays of the layers can be separately switched.

Figure 10:
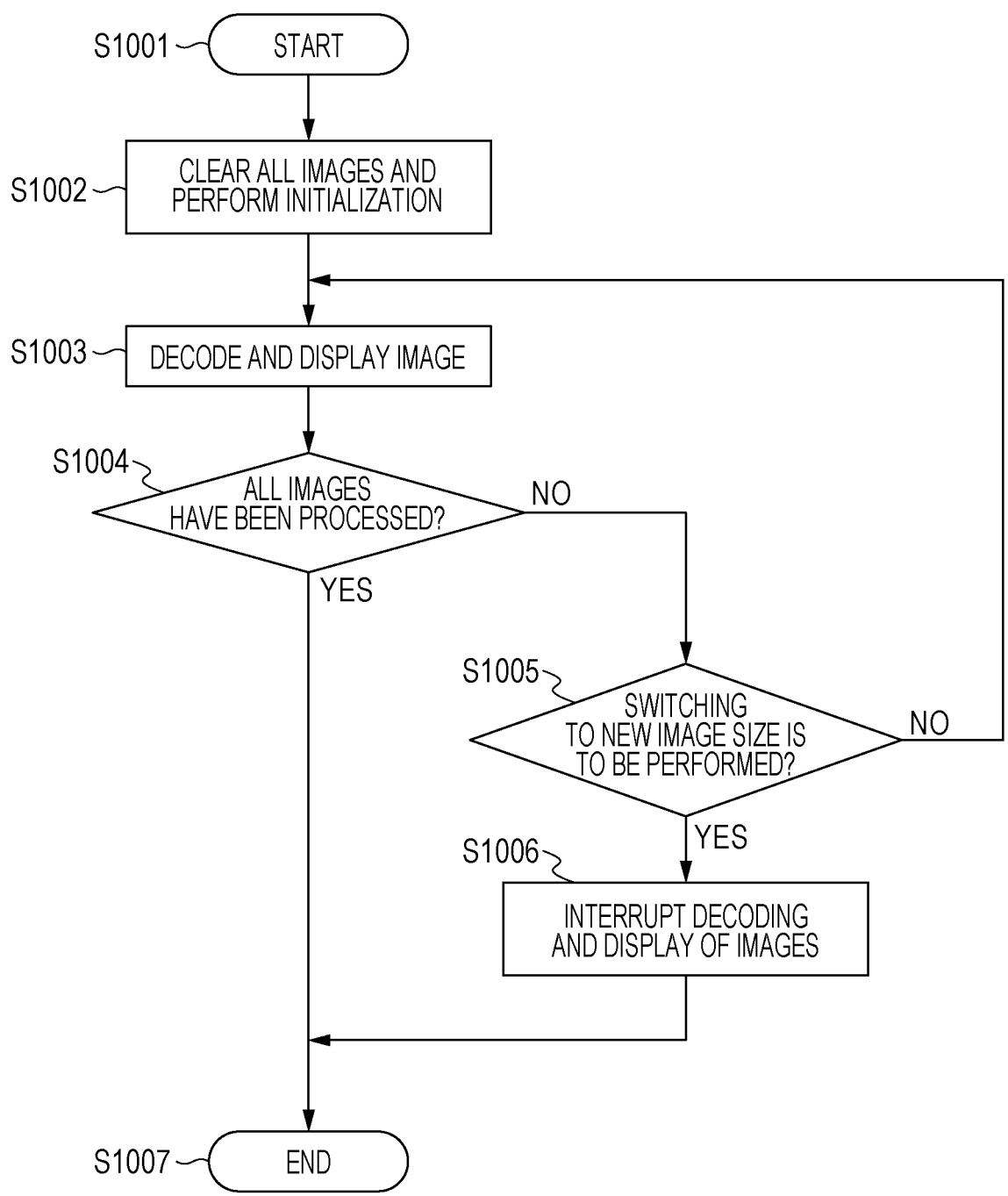
FIG. 10 is a flowchart of a process of changing the number of display images, according to the first embodiment.

FIG. 10 is a flowchart of a process performed by the CPU 101 when an instruction to switch the number of images in the image-display-unit layer in FIG. 5A is transmitted.

The CPU 101 starts the process when the CPU 101 receives an instruction to switch the number of images (in step S1001). This will be described in detail below. The CPU 101 clears all of the images which are currently displayed, and performs initialization, such as determination of information about frames in which images are arrayed and the display image size, in accordance with the number of display images which is included in the instruction (in step S1002).

Then, the CPU 101 reads out pieces of image data from the image list one by one, and decodes an image in accordance with the display image size and disposes the image in accordance with the frame information, thereby displaying a piece of image data at a certain position (in step S1003). Depending on the display image size, decoding may be performed by using a thumbnail image defined in the JPEG format.

The CPU 101 determines whether or not these series of processes have been performed multiple times, as many as the number of display images, i.e., whether or not all of the images have been processed (in step S1004). If all of the images have been processed, the process is ended (in step S1007).

If all of the images have not been processed, the process proceeds to step S1005. In step S1005, the CPU 101 determines whether or not an instruction to perform switching to a new image size (a subsequent instruction to switch the number of images) has been transmitted. Since the processing load for the series of image decoding (in step S1003) is heavy, a subsequent instruction to switch the number of images may be issued through a user operation before display of all of the images is completed. If a subsequent instruction to switch the number of images has not been transmitted, the process returns back to step S1003.

If a subsequent instruction to switch the number of images has been transmitted during processing (in step S1005), the CPU 101 interrupts the decoding and the display of the images (in step S1006), and the process is ended (in step S1007). In this case, the subsequent instruction causes switching of the number of images to be started again (in step S1001).

As described above, only images which need to be displayed are always decoded, achieving an effect that switching of the number of images and display of images can be performed not only with a light processing load on the CPU 101 but also with a small amount of temporal storage memory such as the DRAM 103.

Figure 9:
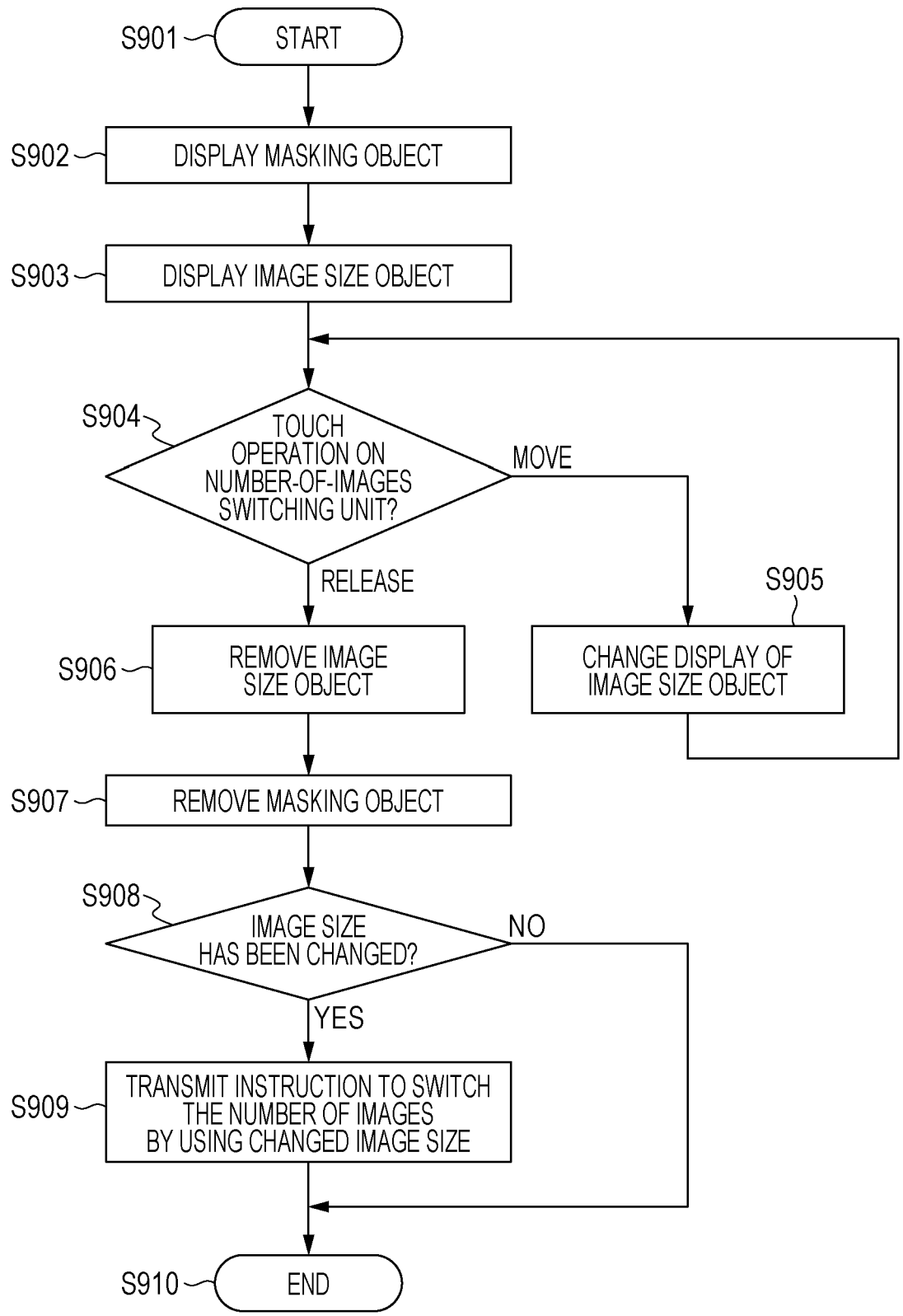
FIG. 9 is a flowchart of a process of switching the image display, according to the first embodiment.

With reference to FIGS. 4A, 4B, 6A, 6B, and 9, an operation of switching the number of display images will be described in detail. FIG. 9 is a flowchart of an image display switching process performed by the CPU 101 when the number-of-images switching switch 403 is touched in the list display mode in the image processing apparatus 100. FIGS. 4A, 4B, 6A, and 6B are diagrams illustrating exemplary image displays in the list display mode.

In a state in which the display is in the list display mode as illustrated in FIG. 4A, when the number-of-images switching unit 402 is touched at a position with the finger 306, the process is started (in step S901).

When the process is started, the display on the display unit 113 is switched to the number-of-images switching mode as illustrated in FIG. 4B. Specifically, to indicate that selection of an image is disabled, the masking object 404, which has been subjected to a transparency process to such a degree that the display image can be recognized, is disposed so as to overlie the entire image display unit 401. That is, the masking object 404 is displayed in the masking object layer (in step S902). At the same time, the image size object 405 having a grid pattern constituted by lines which simply indicate the number of images and the display size is displayed in the image-size-object layer (in step S903). As described above, in the present embodiment, the image size can be changed to a specified image size among the image sizes for the multiple stages depending on a position at which the number-of-images switching unit 402 is touched. Depending on the first touch position, the number-of-images switching switch 403 is moved and the display is switched.

In addition, the image size object 405 representing the image size corresponding to the position is displayed.

Then, an operation performed on the touch panel 115 is continuously checked. Specifically, change in the touch operation on the number-of-images switching unit 402 is determined (in step S904).

Figure 6A:
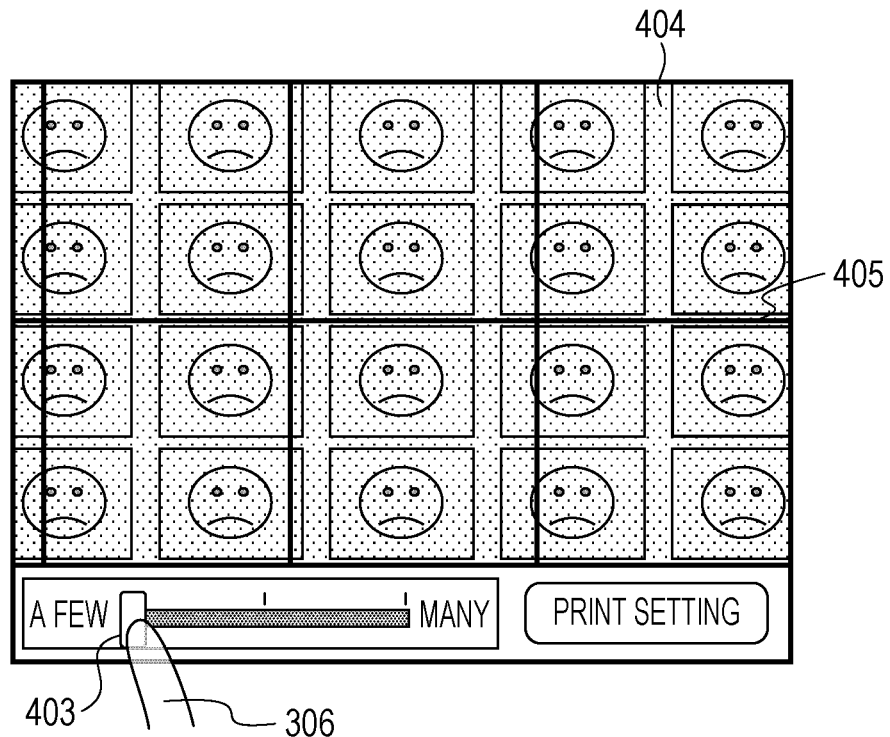
FIGS. 6A to 6B are diagrams illustrating exemplary displays in the list display mode on the display unit according to the first embodiment.

If a move is detected in the touch operation on the number-of-images switching unit 402, the display of the image size object 405 is changed. Specifically, if the CPU 101 detects a move in the direction indicating a small number of images (in FIG. 4B, the left direction from the current center position) while the number-of-images switching switch 403 is being touched with the finger 306, as illustrated in FIG. 6A, the number-of-images switching switch 403 is moved in response to the move of the finger 306. At the same time, the image size object 405 is switched to one for a corresponding one of the stages for the number-of-images switching unit 402, and the switched image size object 405 is displayed (in step S905). In the present embodiment, the image size object 405 is switched to one which visually represents the image size corresponding to the number of images (six images). After that, the image processing apparatus 100 continuously checks if any change occurs in the touch operation (in step S904).

In step S904, if the CPU 101 determines that the user releases the finger 306 from the touch panel, the change of the display size is finally determined. Then, the image size object 405 is removed from the display screen (in step S906), and the masking object 404 is also removed (in step S907).

Then, the CPU 101 determines whether or not the image size which is newly set is the same as one which is currently set (in step S908). If the image size is changed, the CPU 101 transmits an instruction to switch the number of images in accordance with the change in the number of display images (in step S909). If the image size is not changed, the CPU 101 does not transmit any instruction, and ends the process (in step S910).

Figure 6B:
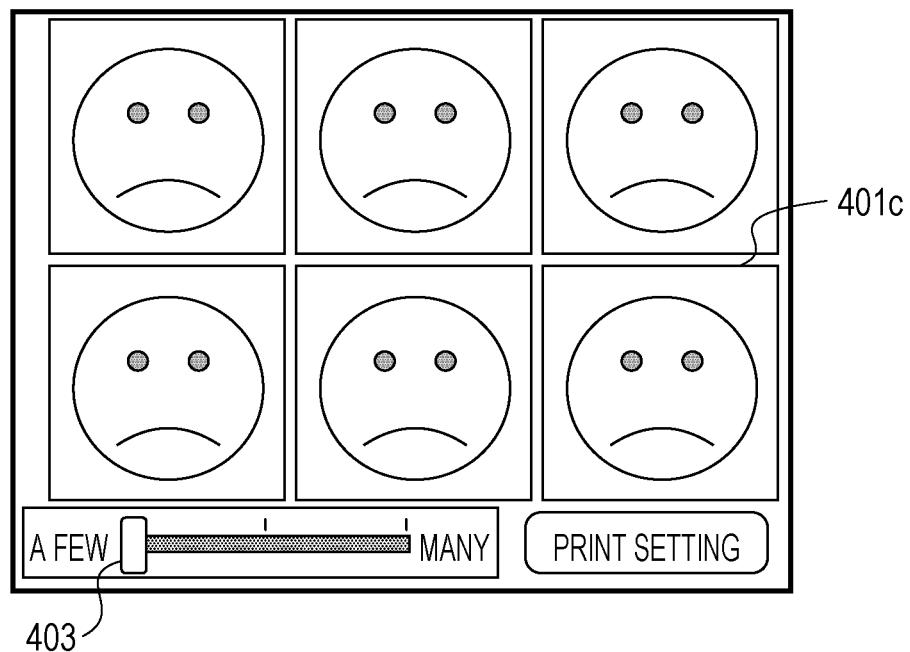

An example for the case in which the image display is to be changed in such a manner that the number of images is decreased will be described. For example, in the state in which 20 images are being displayed as illustrated in FIG. 6A, when the finger 306 is released from the display after the number-of-images switching switch 403 has been moved to the left position corresponding to six images, the image size object 405 and the masking object 404 are removed. Then, through an instruction to switch the number of images, the image-display-unit layer is updated, and the current 20 images are removed. Then, the display is switched so that the image size which is newly set and which corresponds to six images is used in the display. When all of the images are displayed, the switching to the six-image display as illustrated in FIG. 6B is completed.

In the present embodiment, before the image size is changed, a user can check in advance the image size after the switching by using the image size object 405 having a simple configuration. Thus, the operability for a user in selection of a desired image size is improved. In addition, in the present embodiment, after the display size of an image is determined, the decoding is performed. Therefore, unnecessary image decoding is not performed, reducing the load on the CPU 101.

With reference to FIGS. 4A, 4B, 6A, 6B, and 7, an example for a display of images will be described. For example, in the 20-image display as illustrated in FIG. 4A, when the number-of-images switching switch 403 in the number-of-images switching unit 402 is touched, the number-of-images switching mode is turned on, and the display is switched to one as illustrated in FIG. 4B. When a user directly touches the display at a position located on the right side or the left side of the number-of-images switching switch 403 (located at the center position) which is currently displayed, the number-of-images switching switch 403 is moved in accordance with the touch position in the display unit 113. At the same time, the display of the image size object 405 is changed to one corresponding to the touch position. In the display as illustrated in FIG. 4B, by moving the finger 306 while the number-of-images switching switch 403 is being touched with the finger 306, the processes in steps S904 and S905 in FIG. 9 are repeatedly performed, and only display of the number-of-images switching switch 403 and display of the image size object 405 which causes a small amount of load for display change are switched.

Figure 7A:
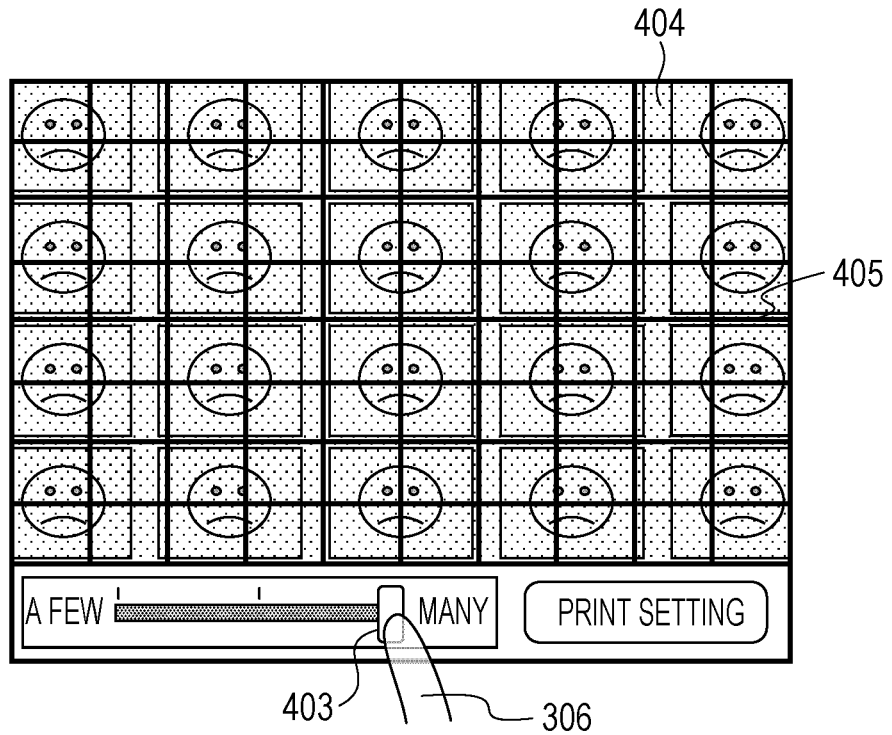
FIGS. 7A and 7B are diagrams illustrating exemplary displays in the list display mode on the display unit according to the first embodiment.

For example, in the display as illustrated in FIG. 4B, the display is sequentially switched as follows. When the finger 306 is moved in the direction indicating a small number of images (in FIG. 4B, in the left direction) while the number-of-images switching switch 403 is being touched with the finger 306, the display is switched to the six-image display as illustrated in FIG. 6A. When the finger 306 is moved back (in FIG. 4B, at the center position), the display is switched to the 20-image display as illustrated in FIG. 4B. When the finger 306 is moved in the direction indicating a large number of images (in FIG. 4B, in the right direction), the display is switched to the 80-image display as illustrated in FIG. 7A.

In the display as illustrated in FIG. 4A, when the left side of the number-of-images switching unit 402 is directly touched, the display of the image size object 405 is switched to one as illustrated in FIG. 6A. That is, when the number-of-images switching switch 403 is moved from the center to the left, only the display of the number-of-images switching switch 403 in the tool bar layer and the display of the object in the image-size-object layer are switched to those for the image size for six images (see FIG. 6A).

Then, when the number-of-images switching switch 403 is moved back to the center position while being touched with the finger 306, only the display of the number-of-images switching switch 403 and the display of the image size object 405 are switched. That is, when the number-of-images switching switch 403 is moved back to the original center position while being touched, only the number-of-images switching switch 403 and the image size object 405 are drawn again, and the display is switched to one as illustrated in FIG. 4B. In this display, when the number-of-images switching switch 403 is released, only the objects in the upper layers are removed, and the display is switched to the 20-image display as illustrated in FIG. 4A (goes back to the state in FIG. 4A). In this case, during the switching of the display, only the drawing of the upper layers which is performed at a relatively high processing speed is performed to reflect the change, and the image decoding which is performed at a relatively low processing speed is not performed, reducing the load on the CPU 101.

Figure 7B:
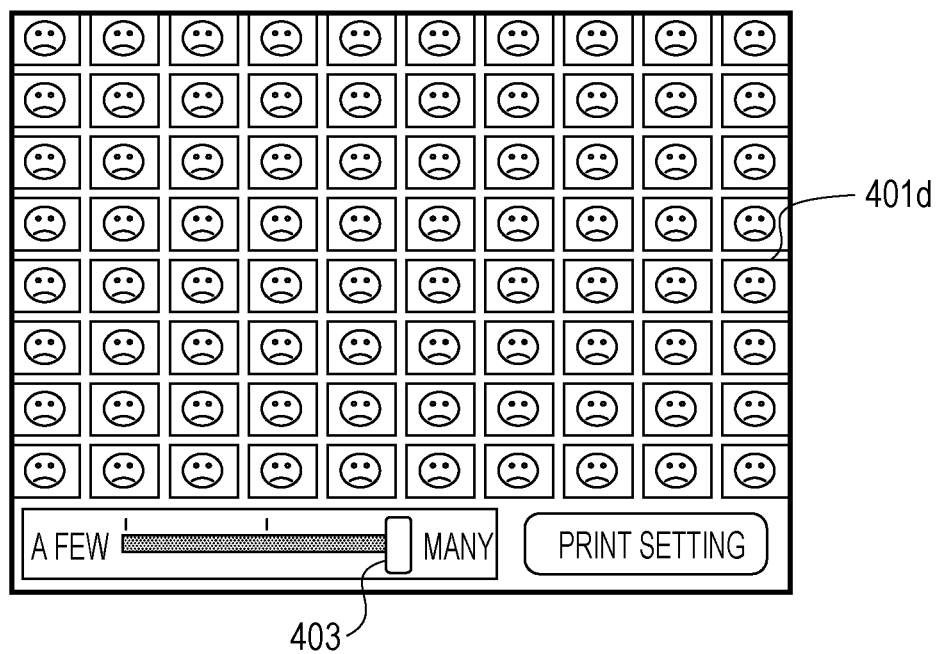

In contrast, in the display as illustrated in FIG. 6A, when the number-of-images switching switch 403 is released, multiple thumbnail images obtained through decoding which is performed with the new image size and which is caused by an instruction to switch the number of images are displayed, and the switching to the display as illustrated in FIG. 6B is completed. In the display as illustrated in FIG. 7A, when the number-of-images switching switch 403 is released, multiple thumbnail images (for example, 401d) obtained through decoding which is performed using the new image size and which is caused by an instruction to switch the number of images are displayed, and the switching to the display as illustrated in FIG. 7B is completed.

Figure 8A:
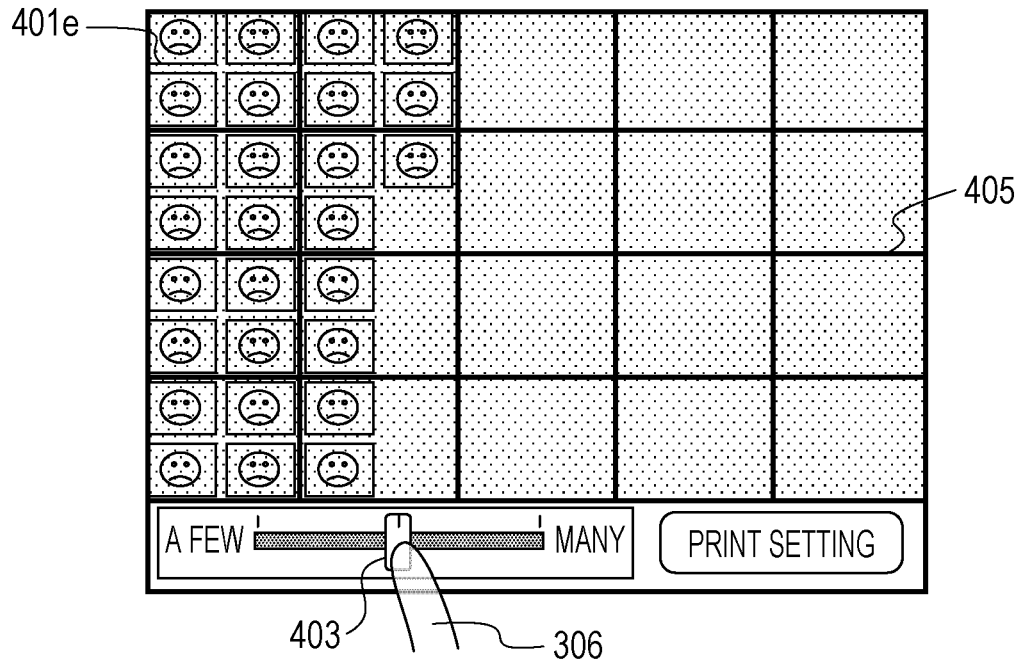
FIGS. 8A and 8B are diagrams illustrating exemplary displays in the list display mode on the display unit according to the first embodiment.
Figure 8B:
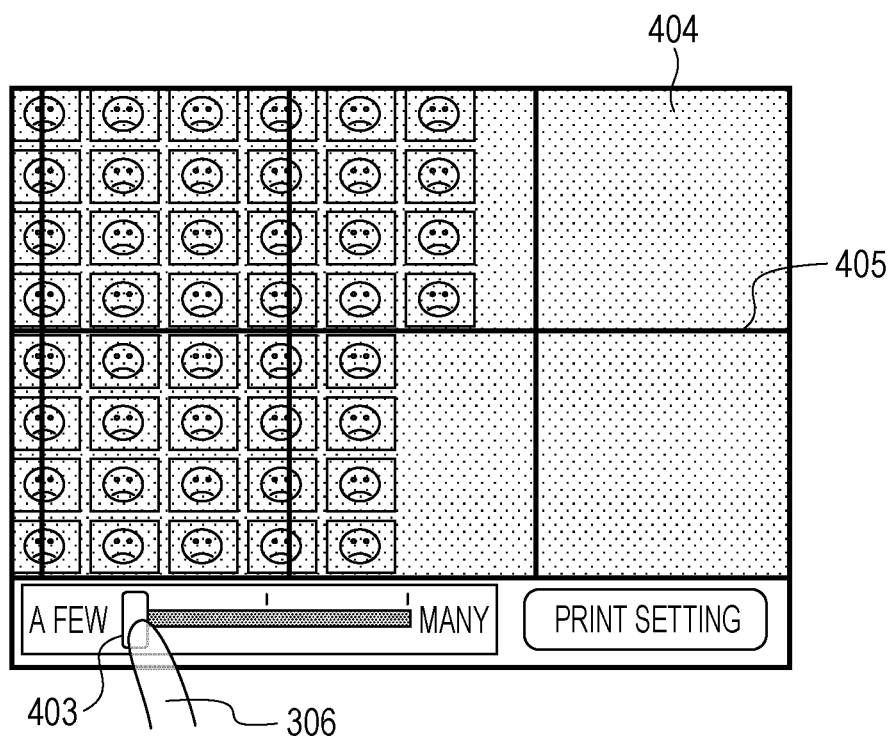

In the image display switching process, the switching of the display of the image-display-unit layer and the switching of the display of the tool bar layer and the image-size-object layer can be separately performed. Therefore, in the present embodiment, in the state in which thumbnail images have not been updated yet, the number-of-images switching switch 403 enables the image size to be changed again. FIGS. 8A and 8B illustrate an example in which, in the state in which thumbnail images have not been updated yet, another size change is started by using the number-of-images switching switch 403. FIG. 8A illustrates an exemplary display in which, in the state in which thumbnail images have not been updated yet, another size change is started by using the number-of-images switching switch 403. In FIG. 8A, in the image-display-unit layer, the display is being switched in order to perform 80-image display which is the display after the switching, in such a manner that image decoding is sequentially performed in accordance with the image list, starting from the upper-left image which is an image 401e. At that time, the display of the tool bar layer and the image-size-object layer is separately switched in an operation using the number-of-images switching switch 403 (in FIG. 8A, a move from the right side to the center). During the switching of the display, the sequential image decoding for the image-display-unit layer is continued. The images are decoded one by one, and the display is updated. When the number-of-images switching switch 403 is operated so as to be further moved in the left direction (switching to the six-image display), as illustrated in FIG. 8B, the display of the tool bar layer and the image-size-object layer is switched during the image decoding. At this time point, when an operation of releasing the number-of-images switching switch 403 is received, the image decoding for the image-display-unit layer is interrupted in order that the display is to be switched to the six-image display (described in step S1006 in FIG. 10). Then, another image decoding process for the six-image display is started again, and the display is switched to one as illustrated in FIG. 6B.

In the present embodiment, image decoding whose processing load is heavy, and an operation in which the display on the display unit is switched and whose processing load is relatively light can be separately processed, and the display image (the number of display images and the display size) after the number of display images is changed can be checked, reducing the load on the CPU 101. In addition, an instruction to switch the number of images can be transmitted through an operation in which the finger 306 on the number-of-images switching switch 403 is moved to the left or to the right on the touch panel, and the display size can be determined through an operation in which the finger 306 is released from the number-of-images switching switch 403, achieving a simplified operation compared with a user operation using a hard key.

That is, in the present embodiment, in an operation performed on the touch panel to switch the number of display images in the image list display mode, image decoding is not performed during switching of the number of images, and only the display of an object which indicates the number of images (and the display size) after the switching and whose display load is not heavy is switched. Using the display size which is set after the number of display images is determined, the image decoding is started. Thus, when the number of display images based on image data is to be switched, before the images themselves are displayed, the number of display images and the display size are visually indicated, reducing the processing load and enabling a user to determine the number of display images and the display size easily.

In the above-described embodiment, the image size object 405 has a grid shape. The shape of the image size object 405 is not limited to this. As long as the image size object 405 has a shape indicating the display size of an image and has a small amount of processing load so as be allowed to be displayed at a high speed, the image size object 405 may have any shape.

In the above-described embodiment, the number of display images is switched in three stages of 6 images, 20 images, and 80 images. This embodiment should not be seen to be limiting. As long as images can be displayed and a touch event can be obtained, no limitation is present on the number of images. In addition, any number may be used as long as multiple switching stages are present.

In the above-described embodiment, the number of display images and the display size which are used after the number of display images for image data is switched are visually indicated. This embodiment should not be seen to be limiting. For example, only the display size may be visually indicated.

In the above-described embodiment, the operation panel 111 includes the touch panel 115, and a touch panel sensor detects a user operation. The display apparatus is not limited to this. For example, in the display apparatus, a user operation may be detected through hard keys or the like which are provided outside the display unit. Alternatively, a user operation such that various buttons of the display unit are pressed by using a pointing device such as a mouse may be detected.

In the above-described embodiment, after a display size is determined on the basis of a switching instruction, decoding is performed so that images having a predetermined display size are displayed. This embodiment should not be seen to be limiting. For example, image data obtained through decoding which was performed before may be stored in a cache memory, and the images may be read out from the cache memory when the images having a predetermined display size are to be displayed.

According to the present embodiment, when the display size of an image based on image data is to be switched, before images themselves are displayed, the display size of an image is visually indicated, reducing the processing load and enabling a user to determine the display size of an image easily.

It is not necessary to achieve all of the above-described processes through software. Some or all of the processes may be achieved through hardware.

OTHER EMBODIMENTS

Additional embodiments of the present invention can also be realized by a computer of a system or apparatus that reads out and executes computer executable instructions recorded on a storage medium (e.g., computer-readable storage medium) to perform the functions of one or more of the above-described embodiments, and by a method performed by the computer of the system or apparatus by, for example, reading out and executing the computer executable instructions from the storage medium to perform the functions of one or more of the above-described embodiments. The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a ROM, a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control method for controlling a display control apparatus, comprising:

displaying a plurality of objects in a predetermined area on a display device, wherein the plurality of objects is a plurality of images based on pieces of image data;

receiving, from a user, a first operation and a second operation, the first operation being an operation of touching an operation portion on a bar located in an area other than the predetermined area, the second operation being an operation of releasing the touching;

displaying newly, in a case where the first operation is received, a predetermined object that is different from the plurality of objects and indicates a size corresponding to a position of the operation portion on the bar, wherein the predetermined object is a set of horizontal and vertical grid lines overlying the plurality of objects that is displayed in a state in which the plurality of objects is displayed on the display device;

resizing, after receiving the first operation and prior to receiving the second operation, the predetermined object to correspond to a size indicated by a current position of the operation portion on the bar as the operation portion is moved on the bar, while maintaining a constant size of the plurality of objects; and changing the size of the plurality of objects from a first size to a second size and removing the predetermined object after receiving the second operation, the first size being the size of the plurality of objects before receiving the first operation, the second size being the size indicated by the predetermined object at time of receiving the second operation and corresponding to a position of the operation portion on the bar at the time of receiving the second operation;

wherein, in a state in which the predetermined object is displayed, the plurality of objects is covered by a masking object and an operation for the plurality of objects is disabled.

2. The control method according to claim 1, further comprising:

displaying, on the display device, an area for displaying a screen for making settings regarding printing of the plurality of objects on a screen in which the plurality of objects is displayed.

3. The control method according to claim 1, further comprising:

displaying, on the display device, a plurality of layers including a layer in which the plurality of objects is arranged, wherein, in a case where the first operation is received, a layer in which the predetermined object is arranged is displayed on the display device over the layer in which the plurality of objects is arranged.

4. The control method according to claim 1,
wherein the masking object is transparent.

5. The control method according to claim 1, further comprising:
executing decoding processing of image data corresponding to the plurality of objects,
wherein the decoding processing is executed after the second operation and is not executed in a timing after receiving the first operation and before receiving the second operation.

6. The control method according to claim 5,
wherein the decoding processing is not executed in a case where, after receiving the first operation, the operation portion returns to a position where the operation portion was located before receiving the first operation.

7. The control method according to claim 1,
wherein the bar is an instruction object that is divided into a plurality of parts, and a size of an object included in the plurality of objects displayed after receiving the second operation is associated with each of the plurality of parts.

8. The control method according to claim 1,
wherein the size of the plurality of objects is not changed in a case where, after receiving the first operation, the operation portion returns to a position where the operation portion was located before receiving the first operation.

9. The control method according to claim 1,
wherein, in a state in which the predetermined object is not displayed, in a case where a predetermined operation is executed for any of the plurality of objects, a display state of, among the plurality of objects, the object for which the predetermined operation is executed is changed; and
wherein, in a state in which the predetermined object is displayed, an operation for the plurality of objects is disabled.

10. The control method according to claim 1, further comprising:
wherein the size indicated by the predetermined object increases as the operation portion is moved on the bar in a first direction, and the size indicated by the predetermined object decreases as the operation portion is moved on the bar in a second direction that is opposite of the first direction.

11. The control method according to claim 10,
wherein, at an area located in the first direction in relation to the bar, an icon indicating that the size indicated by the predetermined object increases as the operation portion is moved on the bar in the first direction is displayed, and, at an area located in the second direction in relation to the bar, an icon indicating that the size indicated by the predetermined object decreases as the operation portion is moved on the bar in the second direction is displayed.

12. The control method according to claim 1, further comprising:
executing processing for printing at least one of the plurality of objects.

13. The control method according to claim 12, further comprising:
receiving, from the user, a selection of at least one of the plurality of objects;
wherein processing for printing the object selected by the user among the plurality of objects is executed.

14. A display control apparatus, comprising:
a processor; and
a memory storing instructions for, when executed by the processor, causing the display control apparatus to operate as:
a first display unit configured to display a plurality of objects in a predetermined area on a display device and displaying an operation portion, wherein the plurality of objects is a plurality of images based on pieces of image data;
a receiving unit configured to receive, from a user, a first operation and a second operation, the first operation being an operation of touching the operation portion on a bar located in an area other than the predetermined area, the second operation being an operation of releasing the touching;
a second display unit configured to display newly, in a case where the first operation is received, a predetermined object that is different from the plurality of objects and indicates information regarding a size that corresponds to a position of the operation portion on the bar, wherein the predetermined object is a set of horizontal and vertical grid lines overlying the plurality of objects that is displayed in a state in which the plurality of objects is displayed on the display device;
a resizing unit configured to resize, after receiving the first operation and prior to receiving the second operation, the predetermined object to correspond to a size indicated by a current position of the operation portion on the bar as the operation portion is moved on the bar, while maintaining a constant size of the plurality of objects; and
a changing unit configured to change the size of the plurality of objects from a first size to a second size and removing the predetermined object after receiving the second operation, the first size being the size of the plurality of objects before receiving the first operation, the second size being a size that corresponds to information indicated by the predetermined object at a time of receiving the second operation and corresponding to a position of the operation portion on the bar at the time of receiving the second operation;
wherein, in a state in which the predetermined object is displayed, the plurality of objects is covered by a masking object and an operation for the plurality of objects is disabled.

15. A non-transitory computer readable storage medium storing computer executable instructions for causing a computer to execute a control method for a display control apparatus, the control method comprising:
displaying a plurality of objects in a predetermined area on a display device, wherein the plurality of objects is a plurality of images based on pieces of image data;
receiving, from a user, a first operation and a second operation, the first operation being an operation of touching an operation portion on a bar located in an area other than the predetermined area, the second operation being an operation of releasing the touching;
displaying newly, in a case where the first operation is received, a predetermined object that is different from the plurality of objects and indicates information regarding a size that corresponds to a position of the operation portion on the bar, wherein the predetermined object is a set of horizontal and vertical grid lines overlying the plurality of objects that is displayed in a state in which the plurality of objects is displayed on the display device;
resizing, after receiving the first operation and prior to receiving the second operation, the predetermined object to correspond to a size indicated by a current position of the operation portion on the bar as the operation portion is moved on the bar, while maintaining a constant size of the plurality of objects; and changing a size of the plurality of objects from a first size to a second size and removing the predetermined object after receiving the second operation, the first size being the size of the plurality of objects before receiving the first operation, the second size being a size that corresponds to the predetermined object indicated by the information at a time of receiving the second operation and corresponding to a position of the operation portion on the bar at the time of receiving the second operation;

wherein, in a state in which the predetermined object is displayed, the plurality of objects is covered by a masking object and an operation for the plurality of objects is disabled.

* * * * *